United States Patent

DeLong

[11] Patent Number: 5,963,251
[45] Date of Patent: Oct. 5, 1999

[54] FRAME TRANSFER READOUT CORRECTION

[75] Inventor: Raymond K. DeLong, Palos Verdes Estates, Calif.

[73] Assignee: TRW Inc., Redondo Beach, Calif.

[21] Appl. No.: 08/794,725

[22] Filed: Feb. 3, 1997

[51] Int. Cl.$^6$ .................................................... H04N 9/64
[52] U.S. Cl. ............................................ 348/249; 348/250
[58] Field of Search .................................... 348/241, 243, 348/248, 249, 250; H04N 5/335, 9/64

[56] References Cited

U.S. PATENT DOCUMENTS

| | | |
|---|---|---|
| 4,229,752 | 10/1980 | Hynecek . |
| 4,331,889 | 5/1982 | Parrish . |
| 4,380,056 | 4/1983 | Parrish et al. . |
| 4,622,584 | 11/1986 | Nagasaki et al. . |
| 4,638,362 | 1/1987 | Oshima et al. . |
| 4,757,385 | 7/1988 | Hieda . |
| 4,935,808 | 6/1990 | Hashimoto . |
| 5,005,062 | 4/1991 | Bakker et al. . |
| 5,012,343 | 4/1991 | Jensen . |
| 5,025,319 | 6/1991 | Mutoh et al. ............................ 348/248 |
| 5,147,088 | 9/1992 | Smith et al. . |
| 5,172,399 | 12/1992 | Hirose . |
| 5,231,673 | 7/1993 | Elenga . |
| 5,309,247 | 5/1994 | Kinoshita et al. . |
| 5,334,868 | 8/1994 | Wong . |
| 5,359,213 | 10/1994 | Lee et al. . |
| 5,402,459 | 3/1995 | Hynecek . |
| 5,459,510 | 10/1995 | Hamalainen . |
| 5,483,091 | 1/1996 | West et al. . |
| 5,739,851 | 4/1998 | Ohsawa et al. ........................ 348/248 |

Primary Examiner—Wendy Garber
Assistant Examiner—Tuan V. Ho
Attorney, Agent, or Firm—Michael S. Yatsko

[57] ABSTRACT

A method for reducing smear in video images generated by a frame transfer CCD imaging system having an array of charge coupled devices. The video images comprise successive image frames, each frame including an array of image pixels corresponding to the array of charge coupled devices. The pixel array has a plurality of rows and columns. Each frame is temporally separated from a next successive frame by an integration time interval during which light falling upon the array of charge coupled devices is integrated to produce integrated charge samples representative of image frame pixel values, and by a transfer interval during which the charge samples are transferred from an imaging area to a storage area.

29 Claims, 4 Drawing Sheets

FIG. 1
Prior Art

Correct the image pixel value of a pixel at a row and column of a frame by:

FIG. 4

FRAME TRANSFER READOUT CORRECTION

BACKGROUND

The present invention generally relates to reducing smear in charged coupled device (CCD) imaging systems, and in particular to reducing smear in Frame Transfer CCD imaging systems.

Frame Transfer CCD focal plane arrays have an image sensing portion including an array of light sensitive pixels arrayed in rows and columns for building up charge during an integrating interval. The devices also include an image storage portion into which the charge from the sensor portion is rapidly transferred during a transfer interval. The image is read out from the storage portion line by line through a horizontal transfer portion.

The image is developed by exposing the active image area to light for the integration interval. The image is then shifted from the active area to the image storage area during the transfer time interval. The image is read horizontally, one line at a time, from the image storage area to a processing circuitry during the time interval in which the next image is being integrated in the active image area.

Frame Transfer CCD focal plane arrays suffer from contamination of wanted signals by unwanted signals, or smear, during the period when the charge is transferred from the active area of the array to the storage area of the array. For large arrays, the transfer rate is limited to about one million lines per second. In the case of an HSIEVNIR FPA, transfer requires approximately 200 microseconds, and the integration time is approximately 4000 microseconds. As such, the detectors can spend about five percent of the time collecting unwanted signals. The unwanted signals are particularly undesirable for scientific instruments where only a small fraction of one percent of unwanted signals is acceptable.

To reduce smear, some existing systems utilize a shutter to prohibit the incidence of light on the active area while the integrated signals are transferred from the active area. Such systems also include a control circuit to control the operation of the shutter during the integration and the transfer time periods. The use of a shutter or similar devices is disadvantageous, however, because of the cost and complexity of the shutter and the control circuitry. Shutters are also typically slow which limits the frame rate.

Other existing systems utilize an interline transfer type system in which an opaque vertical transfer register is provided in the active area for each column of image sensitive devices. After the integration time, the collected charge is migrated to the vertical transfer registers and then transferred to the storage area for read-out. As such, the collected charge in the vertical transfer registers is unaffected by unwanted signals from incident light. However, a major disadvantage of interline systems is the cost and complexity of the vertical transfer registers required. Further, because the vertical transfer registers occupy planar space, the size of the image area is increased dramatically without a commensurate increase in the amount of information gathered by the active image area.

There is, therefore, a need for a method of processing images produced by a Frame Transfer type image array in which the unwanted signals gathered during the transfer time are substantially eliminated without the need for shutter or in-line readout systems.

SUMMARY

The present invention satisfies these needs. The present invention provides a method of reducing smear in video images generated by a frame transfer CCD imaging system having an array of charge coupled devices. The video images comprise successive image frames, each frame including an array of image pixels corresponding to the array of charge coupled devices. The pixel array has a plurality of rows and columns. Each frame is temporally separated from a next successive frame by an integration time interval during which light falling upon said array of charge coupled devices is integrated to produce integrated charge samples representative of image frame pixel values, and by a transfer interval during which said charge samples are transferred from an imaging area to a storage area.

An embodiment of the method of the present invention comprises the steps of correcting the image pixel value of a pixel at a row and a column of a frame by: (a) generating a first sum by adding the pixel values of other pixels within said column of the frame; (b) generating a second sum by adding the pixel values of pixels within the same column of a previous frame up to a pixel in the column corresponding to said pixel; (c) generating a third sum by adding the pixel values of pixels within the same column of a successive frame after a pixel in the column corresponding to said pixel; (d) adding the first, the second and the third sums to generate a fourth sum; (e) generating a ratio of the transfer time to the integration time; (f) generating a correction value by multiplying the ratio and the fourth sum and then halving the result; and (g) subtracting the correction value from the pixel value of said pixel to obtain a corrected pixel value with reduced smear.

Another embodiment of the present invention comprises the steps of: (a) generating a sum by adding the pixel values of other pixels within the column of the frame; (b) generating a ratio of the transfer time to the integration time; (c) generating a correction value by multiplying the ratio and the sum; and (d) subtracting the correction value from the pixel value to obtain a corrected pixel value with reduced smear.

This embodiment uses an algorithm that is computationally simpler than the previous embodiment, and is suitable for readout correction of frame transfers in which the temporal effects are not significant.

Advantageously, the method of present invention provides a way of making the Frame Transfer array perform as well as other arrays without the complexity of the other arrays or without having a shutter.

In another aspect, the present invention provides a software system including program instructions for implementing the steps of the method of the present invention.

DRAWINGS

These and other features, aspects and advantages of the present invention will become understood with reference to the following description, appended claims and accompanying drawings where:

DESCRIPTION

Figure 1:
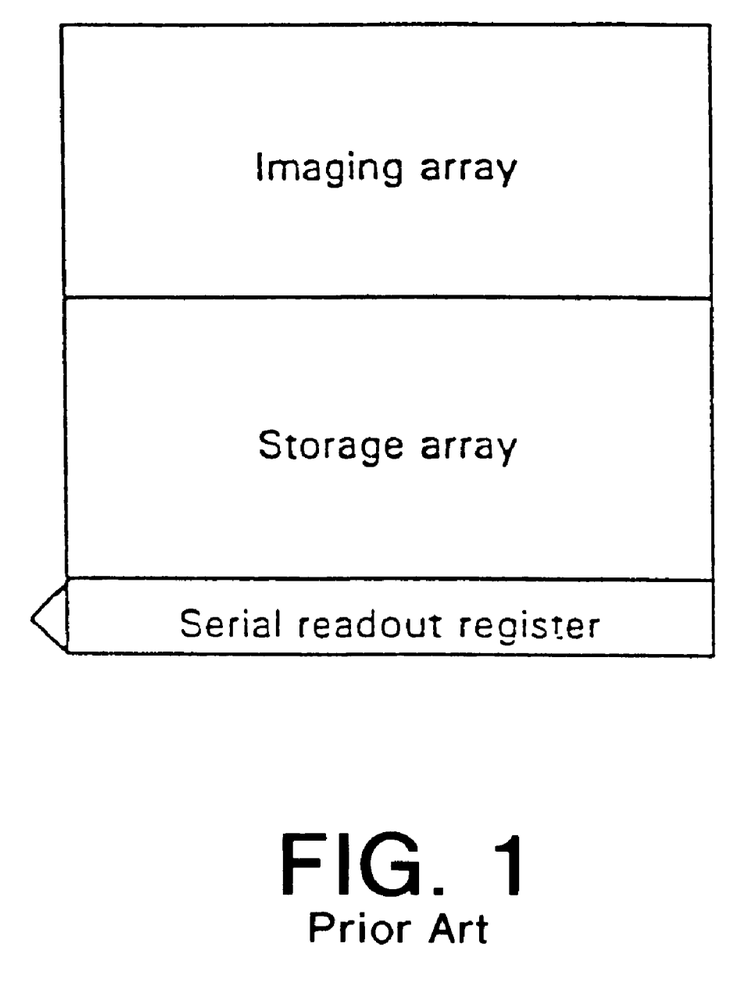
FIG. 1 is a schematic of an existing Frame Transfer CCD system.

The present invention provides a method for reducing smear in video images generated by a frame transfer CCD imaging system having an array of charge coupled devices, a storage area and a serial read-out register as shown in FIG. 1. The video images comprise successive image frames, each frame including an array of image pixels corresponding to the array of charge coupled devices. The pixel array has a plurality of rows and columns. Each frame is temporally separated from a next successive frame by an integration time interval during which light falling upon said array of charge coupled devices is integrated to produce integrated charge samples representative of image frame pixel values, and by a transfer interval during which said charge samples are transferred, or clocked, from an imaging area to a storage area.

Embodiment A

Figure 2:
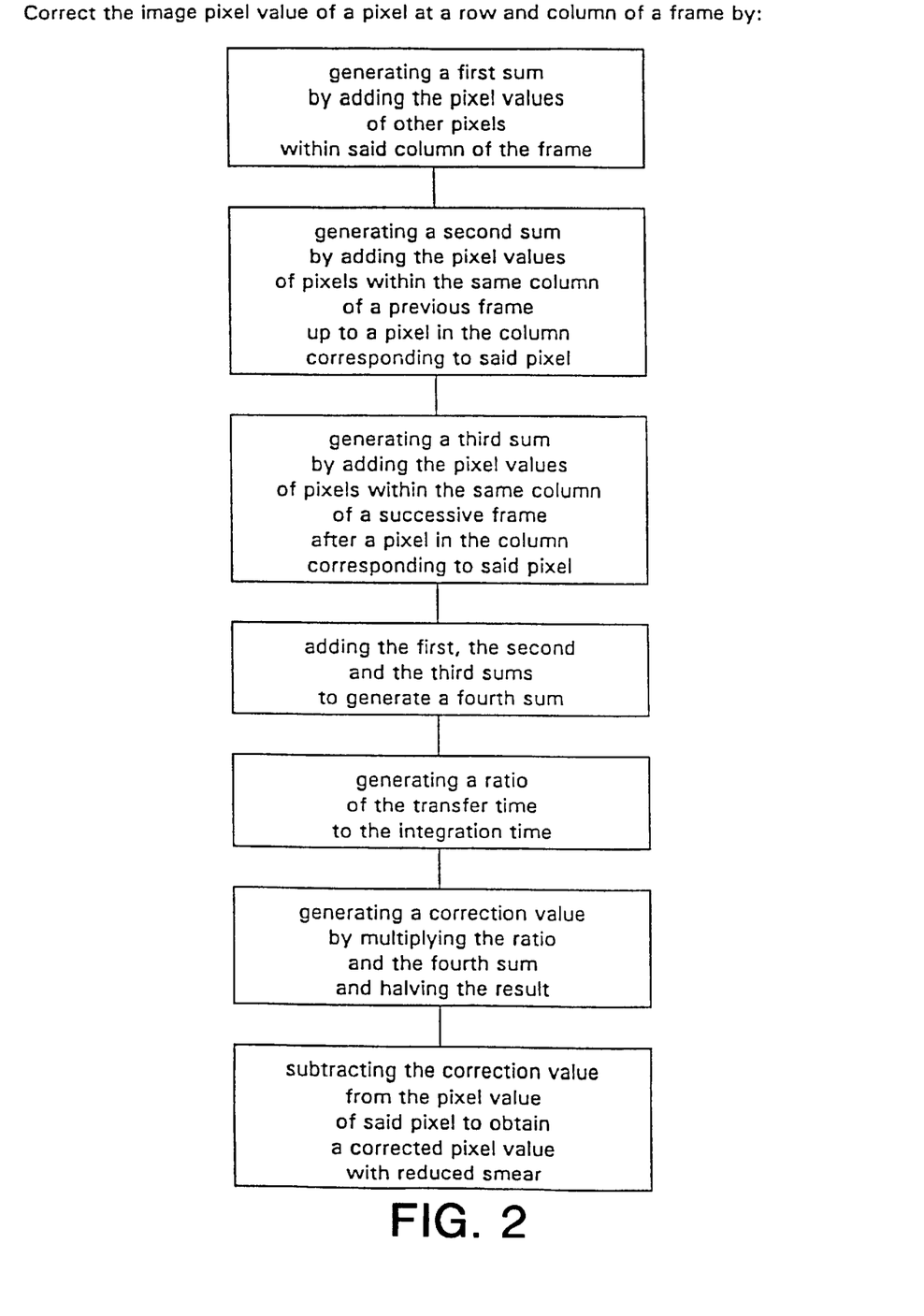
FIG. 2 shows an embodiment of the steps of reducing smear in a Frame Transfer CCD device according to the present invention.

Referring to FIG. 2, an embodiment of the method of the present invention comprises the steps of correcting the image pixel value of a pixel at a row and a column of a frame by: (a) generating a first sum by adding the pixel values of other pixels within said column of the frame; (b) generating a second sum by adding the pixel values of pixels within the same column of a previous frame up to a pixel in the column corresponding to said pixel; (c) generating a third sum by adding the pixel values of pixels within the same column of a successive frame after a pixel in the column corresponding to said pixel; (d) adding the first, the second and the third sums to generate a fourth sum; (e) generating a ratio of the transfer time to the integration time; (f) generating a correction value by multiplying the ratio and the fourth sum and then halving the result; and (g) subtracting the correction value from the pixel value of said pixel to obtain a corrected pixel value with reduced smear.

Preferably, step (a) includes adding the pixel values of all other pixels within said column of the frame. Step (b) can include adding the pixel values of all pixels with the same column of an immediately preceding frame up to a pixel in the column corresponding to said pixel. Step (c) can include adding the pixel values of all pixels with the same column of an immediately succeeding frame after a pixel in the column corresponding to said pixel. Steps (a)–(g) can be repeated for the pixel to correct smearing in all the pixel values.

Alternatively, step (b) can include generating the second sum by adding the pixel values of pixels within the same column of a successive frame up to a pixel in the column corresponding to said pixel, and step (c) can include generating the third sum by adding the pixel values of pixels within the same column of a preceding frame after a pixel in the column corresponding to said pixel.

The method of present invention provides a way of post-processing the image frames generated by the array to correct for unwanted signals collected during the frame transfer time interval.

The above method can be implemented using the following relation:

$$S_l^m(n) = D_l^m(n) - \frac{t_p}{t_{int}} \left[ \frac{1}{2} \sum_{k=n+1}^{N} S_l^{m+1}(k) + \frac{1}{2} \sum_{k=1}^{n-1} S_l^m(k) + \frac{1}{2} \sum_{k=n+1}^{N} S_l^m(k) + \frac{1}{2} \sum_{k=1}^{n-1} S_l^{m-1}(k) \right]$$

Where:
- m=Current frame
- m+1=Successive frame
- m−1=Preceding frame
- n=Pixel row index in transfer direction, numbered from top toward storage area
- N=Maximum number of pixels in transfer direction
- l=Pixel column index (perpendicular to transfer direction)
- S=Corrected signal S(n)
- D=Measured signal D(n)
- $t_p$=Pixel transfer time
- $t_{int}$=Integration time "S" is the corrected signal value, and "D" is the measured signal. To obtain "D", photoelectrons are collected in the imaging area and converted into digital pixel values using an Analog-to-Digital Converter. When transferring the collected energy from the imaging area to the storage area, incident light coming in during the transfer time period contaminates the energy collected during the integration time. The contamination is to the ratio of the pixel transfer time to integration time which is the multiplier in the above relation.

n is an index of pixel numbers starting from the top end of the imaging array numbered toward the storage array. m is the index number of a frame in time. Therefore, where m represents the current frame, m+1 represents the next frame and m−1 represents the preceding frame.

For example, in a 256×256 array, a pixel in the middle of a column, pixel 128, has energy that is clocked in from pixel 1 to pixel 127. The energy then remains in pixel 128 and then clocked out through pixel 129 to 256 before entering the storage area. As such, unwanted energy is absorbed by pixel 1 through 256 during the transfer periods.

The first two terms within the brackets in the above relation account for changes in the intensity of incident light on the array over time from one frame to another. The pixel values for pixels 1 through n−1 are averaged for and immediately preceding frame with those a current frame. The pixel values for pixels n+1 to N are averaged for the current frame and an immediately succeeding frame. As such, the terms within the brackets are averaging for some pixels in the previous frame and the current frame and then for other pixels in the current frame and the next frame. For a first approximation, $S^m\_(k)=D^m\_(k)$. After one or two iterations the values of S substantially represent the desired measured signal without smear.

The method of the present invention can be utilized in imaging instruments such as hyperspectral imagers. A hyperspectral imager has fore optics which image a scene onto a slit in the focal plane. As such, the instrument simply sees an image of a line in object space. This is because a spectrometer disperses the energy in a direction perpendicular to the slit spectrally. As such, in the CCD array, one of the directions along the slit is spatial pixels, and the other direction is spectral channels. Such data are stored and can be processed using the method of the present invention to reduce smear as described above.

In the case of imaging systems for aircraft, for example, the transfer time to imaging time is typically about 1 to 2%. However, in the case of imaging systems for spacecraft, that ratio is about 6 to 8%. The method of the present invention is particularly useful for the latter systems or systems with similar or higher transfer to integration time ratios.

The method of the present invention can be implemented in a software system program comprising program instruction implementing the steps of the method of the present invention. For example, the above relation can be programmed on a personal computer system using a convention programming language such as BASIC or C. The images from the CCD array can be processed in real-time or at a later time. The following is an example of a pseudocode that computes the corrected pixel values according to this embodiment of the present invention.

```
DIM D(256, 256, 3), S(256, 256, 3)
    NMAX = 256
    LMAX = 256
    TINT = .004
    TSUBP = .0002
    RATIO = TSUBP / TINT
    FOR L = 1 TO LMAX
        FOR N = 1 TO NMAX
        SUM1 = 0!
        SUM2 = 0!
        SUM3 = 0!
        IF N > 1 THEN
            FOR K = 1   TO N - 1
                    SUM1 = SUM1 + D(K, L, 2)
                    SUM2 = SUM2 + D(K, L, 1)
            NEXT K
        ELSE
        IF N < NMAX THEN
            FOR K = N + 1 TO NMAX
                    SUM1 = SUM1 + D(K, L, 2)
                    SUM3 = SUM3 + D(K, L, 3)
            NEXT K
        ELSE
        S(N, L, 2) = D(N, L, 2) - .5 * RATIO * (SUM1 + SUM2 + SUM3)
        NEXT N
    NEXT L
END
```

A suitable computer system for executing such computer software system can be a general purpose computer system such as a personal computer or a dedicated computer system.

Figure 3:
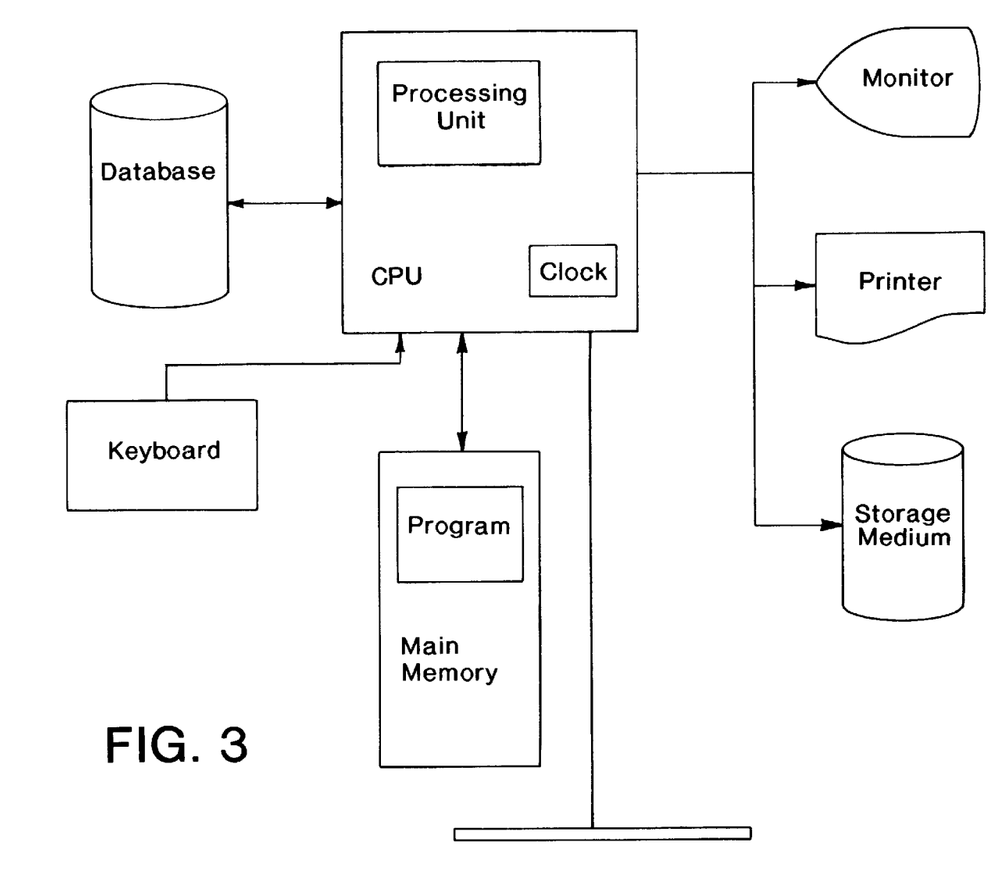
FIG. 3 illustrates a block diagram of a computer system for executing the software system of the present invention.

FIG. 3 shows a functional block diagram of a computer system for executing the software system of the present invention. A central processing unit (CPU) operates on program instructions using the processing unit. The CPU also has a clock/calendar logic circuit for maintaining an internal time/date clock. A database for storing image frames is connected to the CPU over a bus. The database can be located on a file server over a local area network (LAN) or local to the CPU. A keyboard receives instructions from the user concerning the machine operations as necessary. A main memory stores a computer program containing program instructions implementing the method of the present invention.

Embodiment B

Figure 4:
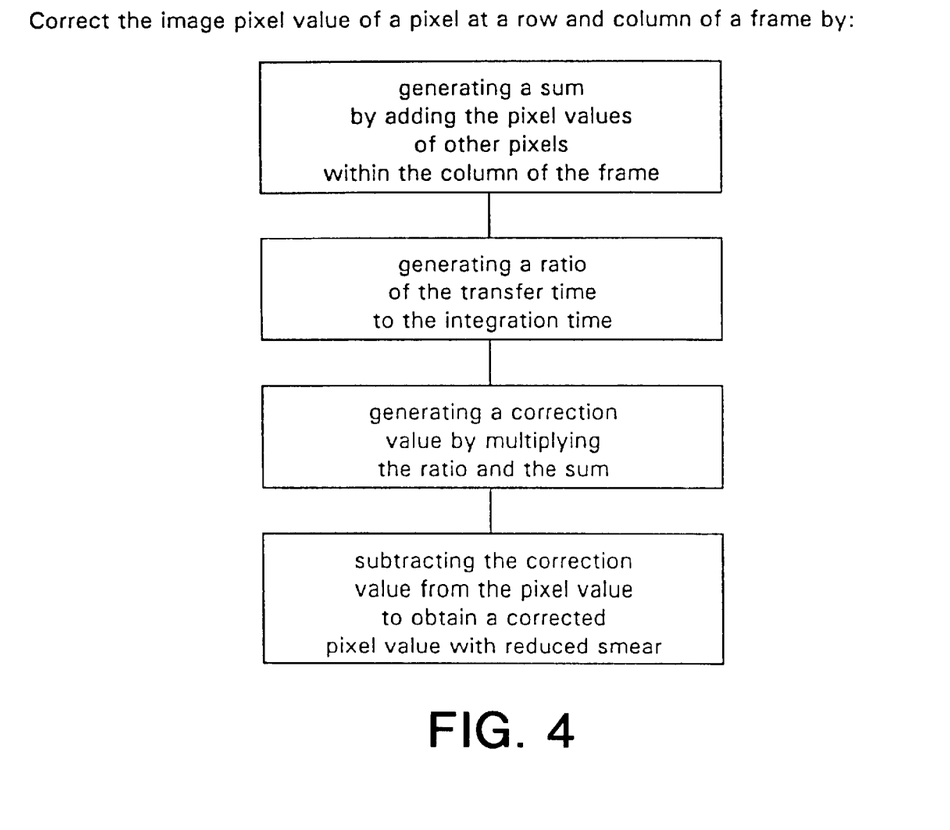
FIG. 4 shows an alternate embodiment of the steps of reducing smear according to the present invention.

FIG. 4 is a block diagram of an alternate embodiment of the method of the present invention comprising the steps of correcting the image pixel value of a pixel at a row and a column of a frame by:

(a) generating a sum by adding the pixel values of other pixels within the column of the frame;

(b) generating a ratio of the transfer time to the integration time;

(c) generating a correction value by multiplying the ratio and the sum; and (d) subtracting the correction value from the pixel value to obtain a corrected pixel value with reduced smear.

Step (a) preferably includes adding the pixel values of all other pixels within the column of the frame in the same manner as step (a) of Embodiment A. Step (b) of this embodiment includes generating a ratio of the transfer time to the integration time in the same manner as step (e) of Embodiment A. In contrast with Embodiment A, however, only the pixel values of other pixels within the column of the same frame need be generated; previous and successive frames need not be considered in this embodiment. In step (c), a correction value is generated by simply multiplying the ratio from step (b) and the sum from step (a). The result of the multiplication need not be halved, thereby saving additional computational time. Finally in step (d), the corrected pixel value is obtained by subtracting the correction value from the pixel value.

The method of this embodiment does not use the pixel values of preceding and succeeding frames to generate the correction value. Therefore, the embodiment is suitable only for readout correction of frame transfers in which the temporal effects are not significant. The following is an example of a pseudocode that computes the corrected pixel values according to this embodiment:

```
DIM D(256, 256), S(256, 256)
    NMAX = 256
    LMAX = 256
    TINT = .004
    TSUBP = .0002
    RATIO = TSUBP / TINT
    FOR L = 1 TO LMAX
        FOR N = 1 TO NMAX
        SUM1 = 0!
        IF N > 1 THEN
            FOR K = 1   TO N - 1
                    SUM1 = SUM2 + D(K, L)
            NEXT K
        ELSE
        IF N < NMAX THEN
            FOR K = N + 1 TO NMAX
                    SUM1 = SUM1 + D(K, L)
            NEXT K
        ELSE
        S(N, L) = D(N, L) - RATIO * SUM1
        NEXT N
    NEXT L
END
```

The present invention has been described in considerable detail with reference to certain preferred versions thereof; however, other versions are possible. Therefore, the spirit and scope of the appended claims should not be limited to the description of the preferred versions contained herein.

A suitable computer system for realizing this embodiment can be the same as or similar to the system as shown in FIG. 3. There are less number of computations within each iteration, and the corrected pixel value for each pixel has a simpler computation than that of Embodiment A. Moreover, Embodiment B requires less memory storage because the pixel values for the preceding and succeeding frames need not be stored. Therefore, a less expensive computer system with less computational throughput and less memory can be used for this embodiment.

The present invention has been described in considerable detail with reference to certain preferred versions thereof; however, other versions are possible. Therefore, the spirit and scope of the appended claims should not be limited to the descriptions of the preferred versions contained herein.

What is claimed is:

1. A method of reducing smear in video images generated by a frame transfer CCD imaging system having an array of charge coupled devices, the video images comprising successive image frames, each frame including an array of image pixels corresponding to the array of charge coupled devices, the pixel array having a plurality of rows and columns, wherein each frame is temporally separated from a next successive frame by an integration time during which light falling upon the array of charge coupled devices is integrated to produce integrated charge samples representative of image frame pixel values, and by a transfer time during which the charge samples are transferred from an imaging area to a storage area, comprising the steps of:

storing image pixels in a memory representing at least a portion of a current frame, a previous frame, and a successive frame;

correcting a pixel value of a predetermined image pixel in a column in the current frame by:

(a) generating a first sum by adding the pixel values of other pixels within the column of the frame;

(b) generating a second sum by adding the pixel values of pixels within the same column of the previous frame up to a pixel in the column corresponding to the predetermined pixel;

(c) generating a third sum by adding the pixel values of pixels within the same column of the successive frame after a pixel in the column corresponding to the predetermined pixel;

(d) adding the first, the second and the third sums to generate a fourth sum;

(e) generating a ratio of the transfer time to the integration time;

(f) generating a correction value by multiplying the ratio and the fourth sum and halving the result;

(g) subtracting the correction value from the pixel value of the predetermined pixel to obtain a corrected pixel value with reduced smear; and (h) replacing the predetermined image pixel with the corrected pixel value.

2. The method of claim 1 wherein step (b) includes adding the pixel values of all pixels within the same column of a previous frame up to a pixel in the column corresponding to the pixel.

3. The method of claim 2 wherein step (b) includes adding the pixel values of all pixels with the same column of an immediately preceding frame up to a pixel in the column corresponding to the pixel.

4. The method of claim 1 wherein step (c) includes adding the pixel values of all pixels within the same column of a successive frame after a pixel in the column corresponding to the pixel.

5. The method of claim 4 wherein step (c) includes adding the pixel values of all pixels with the same column of an immediately succeeding frame after a pixel in the column corresponding to the pixel.

6. The method of claim 1 wherein step (a) includes adding the pixel values of all other pixels within the column of the frame.

7. The method of claim 1 further comprising the step of repeating steps (a)–(g) for all the pixels of the frame.

8. A method of reducing smear in video images generated by a frame transfer CCD imaging system having an array of charge coupled devices, the video images comprising successive image frames, each frame including an array of image pixels corresponding to the array of charge coupled devices, the pixel array having a plurality of rows and columns, wherein each frame is temporally separated from a next successive frame by an integration time during which light falling upon the array of charge coupled devices is integrated to produce integrated charge samples representative of image frame pixel values, and by a transfer time during which the charge samples are transferred from an imaging area to a storage area, comprising the steps of:

correcting each image pixel value in a frame, each pixel located at a row and a column of the frame by:

(a) generating a first sum by adding the pixel values of other pixels within the column of the frame;

(b) generating a second sum by adding the pixel values of pixels within the same column of an immediately preceding frame up to a pixel in the column corresponding to the pixel;

(c) generating a third sum by adding all pixel values of pixels within the same column of an immediately preceding frame after a pixel in the column corresponding to the pixel;

(d) adding the first, the second and the third sums to generate a fourth sum;

(e) generating a ratio of the transfer time to the integration time;

(f) generating a correction value by multiplying the ratio and the fourth sum;

(g) multiplying the correction value by one half;

(h) subtracting the halved correction value from the pixel value of the pixel to obtain a corrected pixel value with reduced smear; and (i) replacing the pixel value of the pixel with the corrected pixel value.

9. A method of reducing smear in video images generated by a frame transfer CCD imaging system having an array of charge coupled devices, the video images comprising successive image frames, each frame including an array of image pixels corresponding to the array of charge coupled devices, the pixel array having a plurality of rows and columns, wherein each frame is temporally separated from a next successive frame by an integration time during which light falling upon the array of charge coupled devices is integrated to produce integrated charge samples representative of image frame pixel values, and by a transfer time during which the charge samples are transferred from an imaging area to a storage area, the method comprising the steps of:

storing image pixels in a memory representing at least a portion of a current frame, a preceding frame, and a successive frame;

correcting a pixel value of a predetermined image pixel in a column in the current frame by:

(a) generating a first sum by adding the pixel values of other pixels within the column of the frame;

(b) generating a second sum by adding the pixel values of pixels within the same column of a successive frame up to a pixel in the column corresponding to the predetermined pixel;

(c) generating a third sum by adding the pixel values of pixels within the same column of a preceding frame after a pixel in the column corresponding to the predetermined pixel;

(d) adding the first, the second and the third sums to generate a fourth sum;

(e) generating a ratio of the transfer time to the integration time;

(f) generating a correction value by multiplying the ratio and the fourth sum and halving the result;

(g) subtracting the correction value from the pixel value of the predetermined pixel to obtain a corrected pixel value with reduced smear and;

(h) replacing the predetermined pixel with the corrected pixel value.

10. The method of claim 9 wherein step (b) includes adding the pixel values of all pixels with the same column of a successive frame up to a pixel in the column corresponding to the pixel.

11. The method of claim 10 wherein step (b) includes adding the pixel values of all pixels with the same column of an immediately succeeding frame up to a pixel in the column corresponding to the pixel.

12. The method of claim 9 wherein step (c) includes adding the pixel values of all pixels within the same column of a preceding frame after a pixel in the column corresponding to the pixel.

13. The method of claim 12 wherein step (c) includes adding the pixel values of all pixels with the same column of an immediately preceding frame after a pixel in the column corresponding to the pixel.

14. The method of claim 9 wherein step (a) includes adding the pixel values of all other pixels within the column of the frame.

15. The method of claim 9 further comprising the step of repeating steps (a)–(g) for all the pixels of the frame.

16. A software system for reducing smear in video images generated by a frame transfer CCD imaging system having an array of charge coupled devices, the video images comprising successive image frames, each frame including an array of image pixels corresponding to the array of charge coupled devices, the pixel array having a plurality of rows and columns, wherein each frame is temporally separated from a next successive frame by an integration time during which light falling upon the array of charge coupled devices is integrated to produce integrated charge samples representative of image frame pixel values, and by a transfer time during which the charge samples are transferred from an imaging area to a storage area, the software system comprising:
    a central processing unit;
    a storage medium coupled to the central processing unit for storing image frames;
    a main memory coupled to the central processing unit, the main memory comprising:
    program instructions for correcting the image pixel value of a pixel at a row and a column of a frame by:
        (a) generating a first sum by adding the pixel values of other pixels within the column of the frame;
        (b) generating a second sum by adding the pixel values of pixels within the same column of a previous frame up to a pixel in the column corresponding to the pixel;
        (c) generating a third sum by adding the pixel values of pixels within the same column of a successive frame after a pixel in the column corresponding to the pixel;
        (d) adding the first, the second and the third sums to generate a fourth sum;
        (e) generating a ratio of the transfer time to the integration time;
        (f) generating a correction value by multiplying the ratio and the fourth sum and halving the result;
        (g) subtracting the correction value from the pixel value of the pixel to obtain a corrected pixel value with reduced smear; and
        (h) replacing the image pixel value with the corrected pixel value.

17. The software system of claim 16 further including program instructions for adding the pixel values of all pixels with the same column of a previous frame up to a pixel in the column corresponding to the pixel.

18. The software system of claim 17 further including program instruction for adding the pixel values of all pixels with the same column of an immediately preceding frame up to a pixel in the column corresponding to the pixel.

19. The software system of claim 18 further including program instructions for adding the pixel values of all other pixels within the column of the frame.

20. The software system of claim 18 further including program instructions for adding the pixel values of all pixels within the same column of a successive frame after a pixel in the column corresponding to the pixel.

21. The software system of claim 20 further including program instructions for adding the pixel values of all pixels with the same column of an immediately succeeding frame after a pixel in the column corresponding to the pixel.

22. A method of reducing smear in video images generated by a frame transfer CCD imaging system having an array of charge coupled devices, the video images comprising successive image frames, each frame including an array of image pixels corresponding to the array of charged coupled devices, the pixel array having a plurality of rows and columns, wherein each frame is temporally separated from the next successive frame by an integration time during which light falling upon the array of charge coupled devices is integrated to produce integrated charge samples representative of image frame pixel values, and by a transfer time during which the charged samples are transferred from an imaging area to a storage area, comprising the steps of:
    storing in a memory image pixels of a frame representing an image;
    correcting a pixel value of a predetermined image pixel in a column in the frame by:
        (a) generating a sum by adding the pixel values of other pixels within the column of the frame;
        (b) generating a ratio of the transfer time to the integration time;
        (c) generating a correction value by multiplying the ratio and the sum; and
        (d) subtracting the correction value from the pixel value to obtain a corrected pixel value with reduced smear,
        (e) replacing the pixel value with the corrected pixel value.

23. The method of claim 22 wherein step (a) includes adding the pixel values of all other pixels within the column of the frame.

24. The method of claim 22, further comprising the step of repeating steps (a)–(d) for all the pixels of the frame.

25. A software system for reducing smear in video images generated by a frame transfer CCD imaging system having an array of charged coupled devices, the video images comprising successive image frames, each frame including an array of image pixels corresponding to the array of charged coupled devices, the pixel array having a plurality of rows and columns, wherein each frame is temporally separated from a next successive frame by an integration time during which light falling upon the array of charge coupled devices is integrated to produce integrated charge samples representative of image frame pixel values, and by a transfer time during which the charged samples are transferred from an imaging area to a storage area, the software system comprising:
    a central processing unit;
    a storage medium coupled to the central processing unit for storing image frames;
    a main memory coupled to the central processing unit, the main memory comprising:
    program instructions for correcting the image pixel value of a pixel at a row and a column of a frame by:
        (a) generating a sum by adding the pixel values of other pixels within the column of the frame;
        (b) generating a ratio of the transfer time to the integration time;
        (c) generating a correction value by multiplying the ratio and the sum;

(d) subtracting the correction value from the pixel value to obtain a corrected pixel value with reduced smear; and (e) replacing the pixel value with the corrected pixel value.

26. The software system of claim 25 wherein the program instructions further include repeating steps (a)–(d) for all the pixels of the frame.

27. A method of reducing smear in video images generated by a frame transfer CCD imaging system, the method comprising:

storing in a memory image pixels of a current frame, a preceding frame, and a successive frame representing an image;

correcting a pixel value of a predetermined image pixel in a column in the current frame by:

(a) forming an average of pixel values across at least one of the preceding, current, and successive frames;

(b) compensating the average for a transfer time and an integration time and subtracting the result from the pixel value to generate a corrected pixel value; and (c) replacing the pixel value with the corrected pixel value.

28. The method of claim 27 wherein said step of forming an average comprises adding an average of pixel values of the preceding frame and corresponding pixels of the current frame to an average of pixel values of the succeeding frame and corresponding pixels of the current frame.

29. The method of claim 27 wherein said step of compensating comprises multiplying the average by the ratio of the transfer time to the integration time and further comprising repeating steps (a)–(c) for each pixel in the frame.

* * * * *